(12) United States Patent
Yamaguchi et al.

(10) Patent No.: US 9,027,160 B2
(45) Date of Patent: May 5, 2015

(54) ACCESS MANAGEMENT SYSTEM AND ACCESS MANAGEMENT METHOD

(75) Inventors: Kumiko Yamaguchi, Koriyama (JP);
Masaharu Nakatsuchi, Yokohama (JP);
Tetsuhiro Tanno, Yokohama (JP); Mao Asai, Kawasaki (JP); Ryo Nakajima, Yokohama (JP)

(73) Assignee: NTT DOCOMO, Inc., Tokyo (JP)

( * ) Notice: Subject to any disclaimer, the term of this patent is extended or adjusted under 35 U.S.C. 154(b) by 512 days.

(21) Appl. No.: 13/393,044

(22) PCT Filed: Jul. 7, 2010

(86) PCT No.: PCT/JP2010/061543
§ 371 (c)(1),
(2), (4) Date: May 8, 2012

(87) PCT Pub. No.: WO2011/024564
PCT Pub. Date: Mar. 3, 2011

(65) Prior Publication Data
US 2012/0222136 A1    Aug. 30, 2012

(30) Foreign Application Priority Data

Aug. 28, 2009    (JP) ................ P2009-198438

(51) Int. Cl.
*G06F 21/24* (2006.01)
*H04W 12/10* (2009.01)
(Continued)

(52) U.S. Cl.
CPC ............... *H04W 12/10* (2013.01); *G06F 21/34* (2013.01); *H04M 1/67* (2013.01); *H04M 1/72525* (2013.01); *H04W 4/00* (2013.01); *H04W 28/04* (2013.01); *H04W 74/00* (2013.01)

(58) Field of Classification Search
CPC ..... G06F 21/34; H04M 1/67; H04M 1/72525; H04W 23/04
USPC ......... 726/30, 9; 713/183, 185; 709/255, 227, 709/229
See application file for complete search history.

(56) References Cited

U.S. PATENT DOCUMENTS

| | | |
|---|---|---|
| 2003/0135748 A1 | 7/2003 | Yamada et al. |
| 2007/0021141 A1 | 1/2007 | Yokota et al. |

(Continued)

FOREIGN PATENT DOCUMENTS

| | | |
|---|---|---|
| CN | 1868229 A | 11/2006 |
| CN | 100407129 C | 7/2008 |

(Continued)

OTHER PUBLICATIONS

Yoshinaga, H., et al., "i-mode FeliCa," NTTDoCoMo Technical Journal, vol. 12, No. 3, pp. 25-32, (Oct. 1, 2004).

(Continued)

*Primary Examiner* — Brandon Hoffman
*Assistant Examiner* — Nega Woldemariam
(74) *Attorney, Agent, or Firm* — Oblon, McClelland, Maier & Neustadt, L.L.P.

(57) ABSTRACT

A secure element (SE) unit 102 holding service data used by an application is provided in a UIM card 100. Thus, when the user identify module (UIM) card 100 is transferred between portable terminals, service data and accompanying information of the application can be moved together with the UIM card 100 to another portable terminal. In addition, an access management unit 400 included in a portable terminal 200 compares UIM information of a UIM information storage unit 103 with UIM information, held by an authority information holding unit 205, of a UIM card of which use authority is possessed by an application. If they do not agree, access to service data stored in the SE unit 102 is restricted.

16 Claims, 10 Drawing Sheets

(51) Int. Cl.
*G06F 21/34* (2013.01)
*H04M 1/67* (2006.01)
*H04M 1/725* (2006.01)
*H04W 4/00* (2009.01)
*H04W 28/04* (2009.01)
*H04W 74/00* (2009.01)

(56) References Cited

U.S. PATENT DOCUMENTS

| 2009/0300747 A1* | 12/2009 | Ahn | 726/9 |
| 2009/0320118 A1* | 12/2009 | Muller et al. | 726/9 |

FOREIGN PATENT DOCUMENTS

| JP | 2003 198718 | 7/2003 |
| JP | 2004 153461 | 5/2004 |
| JP | 2007 4266 | 1/2007 |
| JP | 2007 529056 | 10/2007 |
| WO | 2008 146840 | 12/2008 |

OTHER PUBLICATIONS

Yoshinaga, H., et al., "i-mode FeliCa," NTT DoCoMo Technical Journal, vol. 6, No. 3, pp. 24-31, (Oct. 1, 2004).
Internationional Preliminary Report on Patentability Issued Mar. 13, 2012 in PCT/JP10/61543 Filed Jul. 7, 2010.
International Search Report Issued Oct. 19, 2010 in PCT/JP10/61543 Filed Jul. 7, 2010.
Office Action issued Mar. 27, 2012 in Japan Application No. 2009-198438 (With English Translation).
Combined Office Action and Search Report issued Jan. 3, 2014 in Chinese Patent Application No. 201080037364.7 (with English translation).
Office Action issued Aug. 5, 2014 in Chinese Patent Application No. 201080037364.7 (with English language translation).

* cited by examiner

*Fig.3*

| APPLICATION ID | UIM INFORMATION |
|---|---|
| APPLICATION A | EF_A |
| APPLICATION B | EF_A |
| APPLICATION C | EF_B |
| ⋮ | ⋮ |

*Fig.4*

| APPLICATION A | ApplicationDLURL | http://XXX |
| --- | --- | --- |
| | AreaInformation | AreaX |
| | SystemInformation | SystemX |
| | NonService | OK |
| | ⋮ | ⋮ |

… # ACCESS MANAGEMENT SYSTEM AND ACCESS MANAGEMENT METHOD

TECHNICAL FIELD

The present invention relates to an access management system and an access management method.

BACKGROUND ART

Conventionally, a UIM card (user identify module card) including personal information, telephone number information, and the like is transferred between different portable terminals so that the information such as telephone numbers recorded on the UIM card is inherited and used in the portable terminal to which the UIM card is transferred. With the recent development of electronic money and the like, an IC chip for electronic money is installed in a portable terminal, and the IC chip in the portable terminal is used through contactless communication. In order to use an IC chip exclusively for a particular UIM card in a portable terminal through contactless communication and wired communication from an application program or the like, as shown in FIG. 10, it is necessary that a portable terminal 600 should include an SE (secure element) unit 601 storing and processing data, an application storage unit 606 storing an application that uses service data in the SE unit, a portable terminal-side UIM information storage unit 602 storing UIM information of a UIM card, an SE management unit 603 performing access restriction on the SE unit, an RF (radio frequency) unit 604 for performing contactless communication, and an antenna unit 605. On the other hand, a UIM card 500 inserted into the portable terminal 600 includes a card-side UIM information storage unit 501 storing UIM information that can identify itself. For example, Non-Patent Literature 1 describes that the SE unit 601 is included in the portable terminal 600.

In such a portable terminal 600, in order to implement services such as electronic money, it is necessary to perform an issuance process of registering service data in the SE unit 601 of the IC chip via an application that uses the IC chip in the portable terminal 600. This issuance process is, first, initiated when an issuance process activation flag is set on in the portable terminal 600 upon input operation by a user via an interface corresponding to the application performing an issuance process, upon downloading of an application program, or upon initial startup of an application program. When the issuance process activation flag is set on, the application program initiates communication with a device that performs an issuance process (for example, a server on a network or an authentication unit provided in the inside of the portable terminal itself) and performs the issuance process on the SE unit 601, including data registration and write into the SE unit.

The SE unit 601 stores data (hereinafter referred to as service data) obtained through the issuance process. Here, the portable terminal 600 has an attribute information file (hereinafter also referred to as ADF (Application Description File)) existing for each application. Information of an application and information about service data in the SE unit 601 corresponding to the application are stored in the ADF.

The portable terminal-side UIM information storage unit 602 stores UIM information that permits the use of the IC chip in the portable terminal 600.

The SE management unit 603 compares the UIM information stored in the card-side UIM information storage unit 501 of the UIM card 500 inserted into the portable terminal 600 with the UIM information stored in the portable terminal-side UIM information storage unit 602 and performs access restriction on the service data in the SE unit 601. For example, if the UIM card 500 different from the UIM information stored in the portable terminal-side UIM information storage unit 602 is inserted into the portable terminal 600, the use of the service data in the SE unit 601 that is specified by the ADF corresponding to each application is disabled. In this manner, it is possible to prevent the use of the service data in the SE unit 601 by the UIM card 500 other than the UIM card 500 originally permitted to use. In a case where a UIM card is not inserted into the portable terminal, access to the service data can be restricted, similarly.

When the application having finished the issuance process is deleted from the portable terminal 600, the corresponding ADF and the service data corresponding to the application in the SE unit are also deleted. Such a series of processes avoids a state in which the service data exists in the SE unit 601 and the data in the SE unit is available even though the application does not exist in the portable terminal.

CITATION LIST

Non Patent Literature

Non Patent Literature 1: Japanese Version: "Development of i-mode Felica" NTT DoCoMo Technical Journal Vo. 12, No. 3, p 25-32, English Version: "i-mode FeliCa" NTT DoCoMo Technical Journal Vol. 6, No. 3 p 24-31

SUMMARY OF INVENTION

Technical Problem

However, in the portable terminal 600 described above, when the UIM card 500 is transferred to another portable terminal 600, for example, because of renewal of the portable terminal 600, the service data in the SE unit 601 and the information about the application that uses the data also have to be migrated to another portable terminal 600. Therefore, there has been a problem in that in addition to the operation of transferring the UIM card 500, a data and information migration process has to be performed, which is inconvenient.

In view of the foregoing problem, the present invention therefore aims to provide a convenient access management system and access management method which eliminate the need for separately performing a process of migrating service data and information about an application that uses the data, to another terminal.

Solution to Problem

In order to solve the aforementioned problem, an access management system in the present invention includes a smart card and a terminal reading the smart card to perform processing. The smart card includes identification information storing means for storing smart card identification information that can identify the smart card, service data holding means for holding and processing service data, and information management means for holding access control information for controlling access to the service data. The terminal includes application data storing means for storing program data of an application that uses the service data, authority information holding means for holding the smart card identification information of the smart card of which use authority is possessed by the program data of the application stored in the application data storing means, and access management means for, if the smart card identification information stored in the identification information storing means agrees with the smart card identification information held by the authority information holding means, enabling access to the service data holding means based on the access control information held by the information management means, and if not agree, disabling access to the service data holding means based on the access control information held by the information management means.

In order to solve the aforementioned problem, an access management system in the present invention includes a smart card and a terminal reading the smart card to perform processing. The terminal includes application data storing means for storing program data of an application that uses service data held by the smart card, and authority information holding means for holding a smart card identification information of the smart card of which use authority is possessed by the program data of the application stored in the application data storing means. The smart card includes identification information storing means for storing the smart card identification information of the smart card, service data holding means for holding and processing the service data, information management means for holding access control information for accessing to service data, and access management means for, if the smart card identification information stored in the identification information storing means agrees with the smart card identification information held by the authority information holding means, enabling access to the service data holding means based on the access control information held by the information management means, and if not agree, disabling access to the service data holding means based on the access control information held by the information management means.

In the access management system of the invention in this manner, the service data holding means for holding service data and the information management means are provided in the smart card. Therefore, when the smart card is transferred between terminals, service data and access control information can be moved together with the smart card to another terminal. Accordingly, there is no need for separately performing a process of moving service data and access control information to another terminal, in addition to the operation of transferring the smart card, thereby improving the convenience. Furthermore, when the smart card identification information is not matched, access to the service data held by the service data holding means can be restricted. Accordingly, such inconvenience as unintentional access to the service data held by the service data holding means can be prevented.

In order to solve the aforementioned problem, an access management system of the present invention includes a smart card and a terminal reading the smart card to perform processing. The smart card includes service data holding means for holding and processing service data, and information management means for holding access control information for controlling access to the service data and application authentication information for authenticating the application that uses the service data. The terminal includes application data storing means for storing program data of the application, authority information holding means for holding application authentication information for authenticating the application executed by the program data stored in the application data storing means, and access management means for, if the application authentication information held by the information management means agrees with the application authentication information held by the authority information holding means, enabling access to the service data holding means based on the access control information held by the information management means, and if not agree, disabling access to the service data holding means based on the access control information held by the information management means.

In order to solve the aforementioned problem, an access management system includes a smart card and a terminal reading the smart card to perform processing. The terminal includes application data storing means for storing program data of an application that uses service data held by the smart card, and authority information holding means for holding application authentication information for authenticating the application executed by the program data stored in the application data storing means. The smart card includes service data holding means for holding and processing the service data, information management means for holding access control information for controlling access to the service data and application authentication information for authenticating the application that uses the service data, and access management means for, if the application authentication information held by the information management means agrees with the application authentication information held by the authority information holding means, enabling access to the service data holding means based on the access control information held by the information management means, and if not agree, disabling access to the service data holding means based on the access control information held by the information management means.

In the access management system of the invention in this manner, the service data holding means for holding service data and the information management means are provided in the smart card. Therefore, when the smart card is transferred between terminals, service data and access control information can be moved together with the smart card to another terminal. Accordingly, there is no need for separately performing a process of moving service data and access control information to another terminal, in addition to the operation of transferring the smart card, thereby improving the convenience. Furthermore, when the application authentication information is not matched, access to the service data held by the service data holding means can be restricted. Accordingly, such inconvenience as unintentional access to service data held by the service data holding means can be prevented.

In order to solve the aforementioned problem, an access management system of the present invention includes a smart card and a terminal reading the smart card to perform processing. The smart card includes identification information storing means for storing smart card identification information that can identify the smart card, service data holding means for holding and processing service data, and information management means for holding access control information for controlling access to the service data and application authentication information for authenticating the application that uses the service data. The terminal includes application data storing means for storing program data of the application, authority information holding means for holding application authentication information for authenticating the application executed by the program data stored in the application data storing means and the smart card identification information of the smart card of which use authority is possessed by the program data of the application, and access management means for enabling access to the service data holding means based on the access control information held by the information management means if the smart card identification information stored in the identification information storing means agrees with the smart card identification information held by the authority information holding means and if the application authentication information held by the information management means agrees with the application authentication information held by the authority information holding means, and disabling access to the service data holding means based on the access control information held by the information management means in at least one of cases where the smart card identification information stored in the identification information storing means does not agree with the smart card identification information held by the authority information holding means and where the application authentication information held by the information management means does not agree with the application authentication information held by the authority information holding means.

In order to solve the aforementioned problem, an access management system of the present invention includes a smart card and a terminal reading the smart card to perform processing. The terminal includes application data storing means for storing program data of an application that uses service data held by the smart card, and authority information holding means for holding application authentication information for authenticating the application executed by the program data stored in the application data storing means and the smart card identification information of the smart card of which use authority is possessed by the program data of the application. The smart card includes identification information storing means for storing the smart card identification information of the smart card, service data holding means for holding and processing the service data, information management means for holding access control information for controlling access to the service data and application authentication information for authenticating the application that uses the service data, and access management means for enabling access to the service data holding means based on the access control information held by the information management means if the smart card identification information stored in the identification information storing means agrees with the smart card identification information held by the authority information holding means and if the application authentication information held by the information management means agrees with the application authentication information held by the authority information holding means, and disabling access to the service data holding means based on the access control information held by the information management means in at least one of cases where the smart card identification information stored in the identification information storing means does not agree with the smart card identification information held by the authority information holding means and where the application authentication information held by the information management means does not agree with the application authentication information held by the authority information holding means.

In order to solve the aforementioned problem, an access management method of the present invention is executed in an access management system including a smart card and a terminal reading the smart card to perform processing. The smart card includes identification information storing means for storing smart card identification information that can identify the smart card, service data holding means for holding and processing service data, and information management means for holding access control information for controlling access to the service data and application authentication information for authenticating the application that uses the service data. The terminal includes application data storing means for storing program data of the application, and authority information holding means for holding application authentication information for authenticating the application executed by the program data stored in the application data storing means and the smart card identification information of the smart card of which use authority is possessed by the program data of the application. The method includes a determination step of the terminal determining whether the smart card identification information stored in the identification information storing means agrees with the smart card identification information held by the authority information holding means and whether the application authentication information held by the information management means agrees with the application authentication information held by the authority information holding means, and an access management step of the terminal enabling access to the service data holding means based on the access control information held by the information management means if it is determined by the determination step that the smart card identification information stored in the identification information storing means agrees with the smart card identification information held by the authority information holding means and that the application authentication information held by the information management means agrees with the application authentication information held by the authority information holding means, and disabling access to the service data holding means based on the access control information held by the information management means in at least one of cases where it is determined that the smart card identification information stored in the identification information storing means does not agree with the smart card identification information held by the authority information holding means and where it is determined that the application authentication information held by the information management means does not agree with the application authentication information held by the authority information holding means.

In order to solve the aforementioned problem, an access management method of the present invention is executed in an access management system including a smart card and a terminal reading the smart card to perform processing. The terminal includes application data storing means for storing program data of an application that uses service data held by the smart card, and authority information holding means for holding application authentication information for authenticating the application executed by the program data stored in the application data storing means and a smart card identification information of the smart card of which use authority is possessed by the program data of the application. The smart card includes identification information storing means for storing the smart card identification information of the smart card, service data holding means for holding and processing the service data, and information management means for holding access control information for controlling access to the service data and application authentication information for authenticating the application that uses the service data. The method includes a determination step of the smart card determining whether the smart card identification information stored in the identification information storing means agrees with the smart card identification information held by the authority information holding means and whether the application authentication information held by the information management means agrees with the application authentication information held by the authority information holding means, and an access management step of the smart card enabling access to the service data holding means based on the access control information held by the information management means if it is determined by the determination step that the smart card identification information stored in the identification information storing means agrees with the smart card identification information held by the authority information holding means and that the application authentication information held by the information management means agrees with the application authentication information held by the authority information holding means, and disabling access to the service data holding means based on the access control information held by the information management means in at least one of cases where it is determined that the smart card identification information stored in the identification information storing means does not agree with the smart card identification information held by the authority information holding means and where it is determined that the application authentication information held by the information management means does not agree with the application authentication information held by the authority information holding means.

In the access management system and access management method of the invention in this manner, the service data holding means for holding service data and the information management means are provided in the smart card. Therefore, when the smart card is transferred between terminals, service data and access control information can be moved together with the smart card to another terminal. Accordingly, there is no need for separately performing a process of moving service data and access control information to another terminal, in addition to the operation of transferring the smart card, thereby improving the convenience. Furthermore, when the application authentication information and the smart card identification information are not matched, access to the service data held by the service data holding means can be restricted. Accordingly, such inconvenience as unintentional access to the service data held by the service data holding means can be prevented.

Preferably, in the access management system in the present invention, when the information management means has application authentication information for authenticating a first application and program data of the first application is not stored in the application data storing means, the access management means only partially enables access to the service data used by the first application that is held by the service data holding means. Accordingly, even when program data of an application does not exist in the terminal, access to the service data held by the service data holding means of the smart card is enabled, thereby improving convenience.

Preferably, in the access management system in the present invention, the terminal further includes application data acquisition means for, if the information management means holds application authentication information for authenticating a second application and if the authority information holding means does not hold application authentication information for authenticating the second application, acquiring program data of the second application through communication means and storing the program data into the application data storing means. Accordingly, when the smart card side has application authentication information of an application but the terminal side does not have program data of the application, the program data of the application can be acquired.

Preferably, in the access management system in the present invention, the terminal further includes application data acquisition means for, if program data of a second application is stored in the application data storing means and if the access management means determines that the smart card identification information, held by the authority information holding means, of the smart card of which use authority is possessed by the program data of the second application does not agree with the smart card identification information stored in the identification information storing means, acquiring new program data of the second application and storing the program data into the application data storing means. Accordingly, when the terminal side has program data of an application but the program data of the application does not have the use authority of the smart card, the program data of the application can be newly acquired.

Preferably, in the access management system in the present invention, the terminal further includes application management means for, if the access management means determines that the smart card identification information, held by the authority information holding means, of the smart card of which use authority is possessed by the program data of the second application does not agree with the smart card identification information stored in the identification information storing means, deleting the program data of the second application determined such that the smart card identification information does not agree, from the application data storing means, and deleting the smart card identification information of the smart card of which use authority is possessed by the program data of the second application determined such that the smart card identification information does not agree, from the authority information holding means. Accordingly, accumulation of unnecessary information in the application data storing means and the authority information holding means can be prevented, so that the application data storing means and the authority information holding means can be used efficiently.

Preferably, in the access management system in the present invention, the terminal further includes acquisition necessity receiving means for presenting to a user of the terminal whether acquisition of the program data of the second application is necessary when the application data acquisition means acquires the program data of the second application, and receiving input operation by the user of the terminal as to whether acquisition is necessary. The application data acquisition means acquires the program data of the second application according to a result of receiving by the acquisition necessity receiving means. Accordingly, when program data of an application is acquired, an inquiry as to whether acquisition is necessary can be made for the user. Therefore, acquisition of the program data not intended by the user can be prevented, thereby improving the user's convenience.

Preferably, in the access management system in the present invention, the information management means further holds URL information for downloading the second application as the access control information in the second application. The communication means can acquire the program data of the second application through wireless communication. The application data acquisition means acquires the program data of the second application through wireless communication by the communication means based on the URL information for downloading the second application that is held by the information management means. Accordingly, the program data of the application can be acquired through wireless communication based on the URL information, thereby improving the convenience of program data acquisition.

Preferably, in the access management system in the present invention, when the application data acquisition means acquires the program data of the second application, at least one of the followings is performed: the information management means rewrites at least one of the access control information and the application authentication information in the second application; the authority information holding means rewrites the smart card identification information of the smart card of which use authority is possessed by the program data of the second application; and the authority information holding means rewrites the application authentication information in the second application. Accordingly, the smart card identification information, the application authentication information, and the access control information can be rewritten at a prescribed timing.

Preferably, in the access management system in the present invention, when a third application is initially started or when the service data used by the third application that is held in the service data holding means is accessed, at least one of the followings is performed: the information management means rewrites at least one of the access control information and the application authentication information in the third application; and the authority information holding means rewrites the smart card identification information of the smart card of which use authority is possessed by program data of the third application. Accordingly, the smart card identification information, the access control information, and the application authentication information can be rewritten at a prescribed timing.

Advantageous Effects of Invention

According to the present invention, when a smart card is transferred between terminals, service data used by an application and access control information can be moved together with the smart card to another terminal. This eliminates the need for separately performing a process of moving service data and access control information to another terminal, in addition to the smart card transfer operation, thereby improving convenience. Furthermore, access to the service data held by the service data holding means can be restricted. Thus, it is possible to prevent such inconvenience as unintentional access to the service data held by the service data holding means.

BRIEF DESCRIPTION OF DRAWINGS

FIG. 3 is a diagram showing information held by an authority information holding unit.

FIG. 4 is a diagram showing individual management information held by an information management unit.

DESCRIPTION OF EMBODIMENTS

Figure 1:
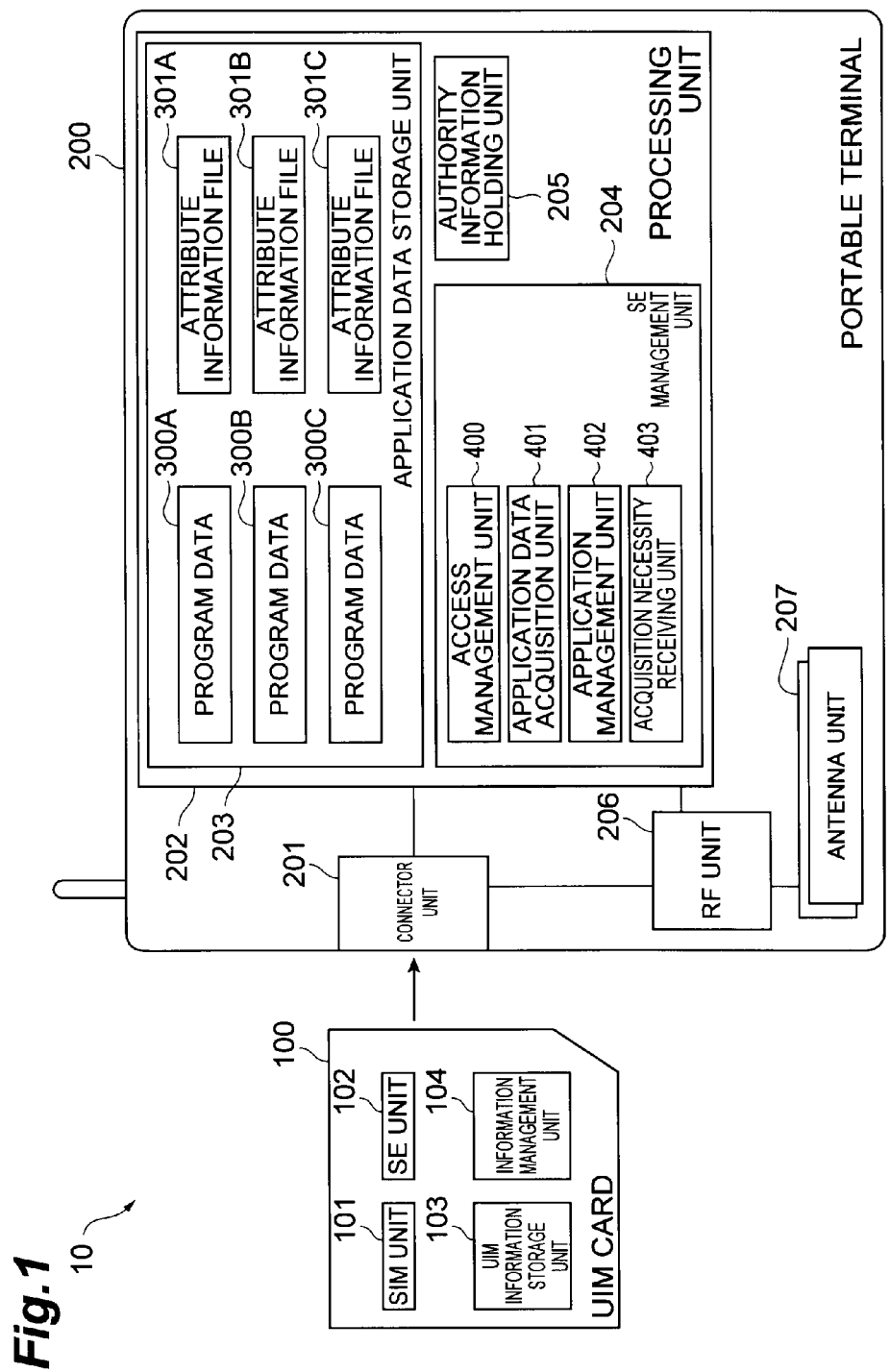
FIG. 1 is a diagram showing an overall configuration of an access management system in a first embodiment.

In the following, embodiments of the present invention will be described with reference to the accompanying drawings. The same parts are denoted with the same reference numerals, if possible, and an overlapping description will be omitted.

First Embodiment

[General Configuration of Access Management System 10]

First of all, a general configuration of an access management system 10 according to a first embodiment of the present invention will be described using FIG. 1. FIG. 1 is a configuration overview of the access management system 10. As shown in FIG. 1, the access management system 10 includes a UIM card 100 (the smart card in the claims) and a portable terminal 200 (the terminal in the claims). The UIM card 100 is inserted into and connected to a connector unit 201 of the portable terminal 200. The UIM card 100 is attachable to and removable from the portable terminal 200. The UIM card 100 can be removed from the portable terminal 200, and inserted into and connected to another portable terminal 200. The portable terminal 200 and the UIM card 100 can be combined to perform various processing through short-range wireless communication. NFC (Near Field Communication) can be used as the short-range wireless communication.

[Configuration of UIM Card 100]

The UIM card 100 mainly holds service data necessary for the portable terminal 200 to execute communication services using an SE unit 102 (described in detail later) and information for the portable terminal 200 to perform a call function. For this purpose, as shown in FIG. 1, the UIM card 100 includes an SIM (Subscriber Identity Module) unit 101, the SE unit 102 (the service data holding means in the claims), a UIM information storage unit 103 (the identification information storing means in the claims), and an information management unit 104 (the information management means in the claims). Personal information, authentication information, etc., for the portable terminal 200 to perform a call function, data communication, etc., are stored in the SIM unit 101. The SE unit 102 stores service data obtained by performing an issuance process from a server on a network implementing communication services using the SE unit 102, and performs a process (the process performed by the service data holding means in the claims) of permitting viewing of data having no access restriction among service data, in response to a request, for example, from an application program or an external data read device via short-range wireless communication. The UIM information (the smart card identification information in the claims) for identifying the UIM card 100 is stored in the UIM information storage unit 103. The information management unit 104 holds information about an application that uses the service data. The SE unit 102 is compatible with, for example, FeliCa® technique. The SE unit 102, the UIM information storage unit 103, and the information management unit 104 may be included in the SIM unit 101.

[Configuration of Portable Terminal 200]

The portable terminal 200 executes communication services using the SE unit 102 in the UIM card 100 to provide a variety of services, such as an electronic money payment process, to the user of the portable terminal 200. Therefore, as shown in FIG. 1, the portable terminal 200 includes the connector unit 201 connected to the UIM card 100 for reading information in the UIM card 100, a processing unit 202 performing a process of executing a communication service using the SE unit 102 in the UIM card 100, an RF unit 206 performing signal conversion and the like for performing short-range wireless communication between a not-shown communication device installed in the outside of the portable terminal 200 and the UIM card 100, and an antenna unit 207 for transmitting/receiving a signal in a contactless manner. The UIM card 100, the processing unit 202, the RF unit 206, and the like are powered from a not-shown battery unit included in the portable terminal 200.

The processing unit 202 includes an application data storage unit 203 (the application data storing means in the claims) storing program data of an application implementing a communication service using the SE unit 102, an SE management unit 204 performing control on access to the SE unit 102 based on information held by the information management unit 104, and an authority information holding unit 205 (the authority information holding means in the claims) holding an application ID stored in the application data storage unit 203 (which may be an application name or may be a combination of an application name and an ID associated therewith. This is applicable in the following description) and the UIM information of the UIM card 100 of which use authority is possessed by the program data of the application.

Program data 300A for executing an application A and an attribute information file 301A in which the address of service data of the application A in the SE unit 102, etc., is described are stored as program data of the application in the application data storage unit 203. Similarly, program data 300B and an attribute information file 301B of an application B, and program data 300C and an attribute information file 301C of an application C are stored in the application data storage unit 203. Although the program data of three kinds of applications is stored in the application data storage unit 203 in the present embodiment, by way of example, the number of applications stored is not limited thereto. The attribute information may be included in the program data of the application.

The SE management unit 204 includes an access management unit 400 (the access management means in the claims) controlling access to the service data in the SE unit 102, an application data acquisition unit 401 (the application data acquisition means in the claims) acquiring program data of an application for storage into the application data storage unit 203, an application management unit 402 (the application management means in the claims) performing management of the program data of the application stored in the application data storage unit 203, and an acquisition necessity receiving unit 403 (the acquisition necessity receiving means in the claims) asking the user of the portable terminal 200 whether to acquire program data at a time of acquisition of program data by the application data acquisition unit 401. The access management unit 400 transmits information about an access-restricted area in the SE unit 102, to the SE unit 102. The SE unit 102 performs access restriction on a prescribed region based on the information from the access management unit 400, so that the access to prescribed data of the stored service data is restricted. Similarly, the SE unit 102 lifts the access restriction on the prescribed region based on the information from the access management unit 400, so that the access restriction on the prescribed data of the stored service data is lifted.

Figure 2:
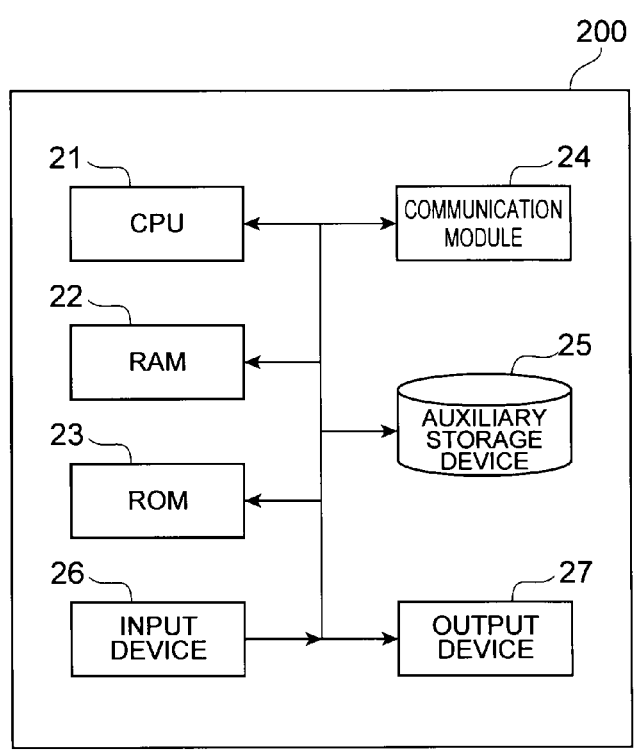
FIG. 2 is a hardware block diagram of a portable terminal.

Next, a hardware configuration of the portable terminal 200 will be described. FIG. 2 is a hardware block diagram of the portable terminal 200. As shown in FIG. 2, the portable terminal 200 is physically configured as a system mainly including a CPU 21, a RAM 22 and a ROM 23 serving as main storage devices, a communication module 24 (communication means) serving as a device for data transmission/reception over a wireless communication network, an auxiliary storage device 25 such as a flash memory, an input device 26 such as a button operation unit serving as an input device, and an output device 27 such as a display. Each function performed in the processing unit 202 shown in FIG. 1 is implemented by allowing the hardware such as the CPU 21 or the RAM 22 shown in FIG. 2 to read prescribed software to bring the communication module 24, the input device 26, and the output device 27 into operation under the control of the CPU 21, and by performing data read and write from/into the RAM 22 or the auxiliary storage device 25.

Next, information held by the authority information holding unit 205 will be described. FIG. 3 is a diagram showing information held by the authority information holding unit 205. As shown in FIG. 3, an application ID stored in the application data storage unit 203 and UIM information of the UIM card of which use authority is possessed by the program data of the application for each application are stored in the authority information holding unit 205. For example, as shown in FIG. 3, the UIM card of which use authority is possessed by the program data of the applications A, B has "EF_A" as the UIM information. The UIM card of which use authority is possessed by the program data of the application C has "EF_B" as the UIM information. (Of the information held by the authority information holding unit 205, the application ID corresponds to the application authentication information in the claims, and the UIM information corresponds to the smart card identification information.)

Next, the information held by the information management unit 104 will be described. The information about the application held by the information management unit 104 is input through an issuance process performed by the application executing a communication service using the SE unit 102. FIG. 4 is a diagram showing information about the application A held by the information management unit 104. As shown in FIG. 4, in the information management unit 104, included as information about the application A are an application ID (application A), information (Application DLURL) indicating the downloading destination of the program data of the application A, address information (Area Information) and (System Information) of the service data corresponding to the application A in the SE unit 102, information (Nonservice) indicating whether the service data corresponding to the application A in the SE unit 102 is available when the program data of the application A does not exist in the application data storage unit 203, and the like. It is noted that the information about the application held by the information management unit 104 is hereinafter referred to as individual management information. The information management unit 104 holds the individual management information as shown in FIG. 4 by at least the number of applications for which the issuance process has been performed. Since the individual management information is stored in the information management unit 104 during downloading of an application program, service data may not be issued only by downloading the program. The applications using the SE unit 102 include an application that issues service data and an application that only uses the service data issued for another application. Such an application that only uses service data issued for another application has an attribute information file and individual management information but does not have information for access restriction in the individual management information. In an example shown in the present embodiment, the issuance process has been performed for all the applications corresponding to the information included in the individual management information. (Of the individual management information, the application ID corresponds to the application authentication information in the claims. Of the individual management information, the address information of the service data corresponding to the application, the information indicating whether to permit the use of the service data in the SE unit 102 when the program data of the application does not exist in the application data storage unit 203, etc., correspond to the access control information in the claims.)

[Process Flow in Power-on of Portable Terminal 200]

Figure 5:
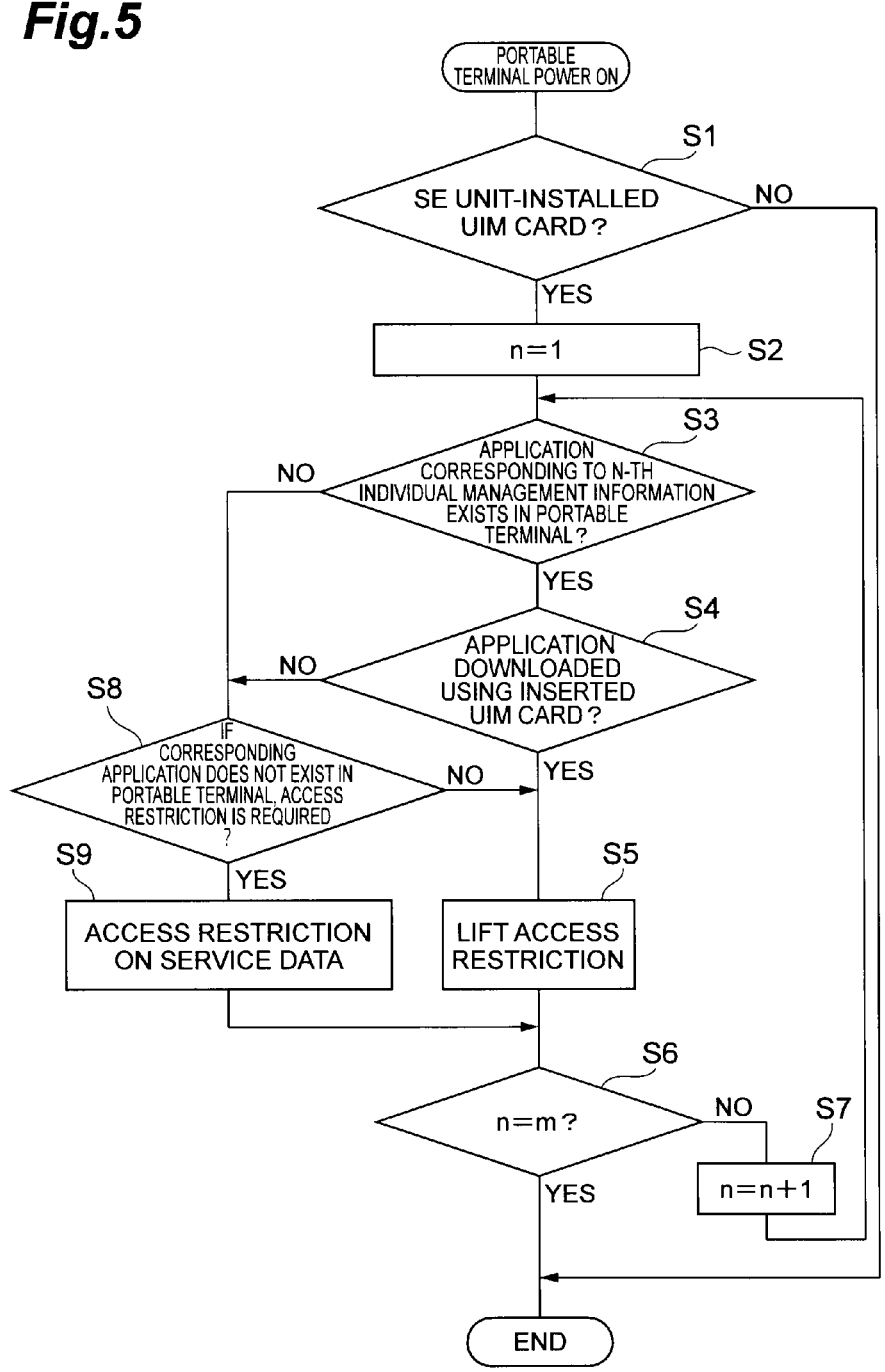
FIG. 5 is a flowchart showing a flow of a process at power-on of the portable terminal.

Next, a process executed by the SE management unit 204 when the portable terminal 200 is powered on will be described. FIG. 5 is a flowchart showing a flow of a process executed by the SE management unit 204 at power-on of the portable terminal 200. The flowchart in FIG. 5 is initiated when the portable terminal 200 is powered on. When the portable terminal 200 is powered on, the access management unit 400 in the SE management unit 204 determines whether the UIM card 100 inserted into the connector unit 201 is a UIM card having the SE unit 102 (step S1). If it is not a UIM card having the SE unit 102 (step S1: NO), this process ends, assuming that execution of a communication service using the SE unit 102 is impossible.

On the other hand, if the UIM card 100 has the SE unit 102 (step S1: YES), the access management unit 400 sets a variable n used in this process to one (step S2).

Then, the access management unit 400 determines whether the application program corresponding to the n-th individual management information among a plurality of individual management information held by the information management unit 104 is stored in the application data storage unit 203 (step S3 (the determination step in the claims)). Specifically, the access management unit 400 compares the application ID of the individual management information held by the information management unit 104 with the application ID of the information held by the authority information holding unit 205 to determine whether the application program exists in the application data storage unit 203. The determination in step S3 is hereinafter referred to as application authentication.

If it is determined that the application program corresponding to the n-th individual management information is stored in the application data storage unit 203 (step S3: YES), the access management unit 400 determines whether the program data of the application corresponding to the n-th individual management information is the one downloaded using the UIM card 100 currently inserted into the connector unit 201 (step S4 (the determination step in the claims)). Specifically, the access management unit 400 makes the determination by comparing the UIM information of the UIM card of which use authority is possessed by the program data of the n-th application held by the authority information holding unit 205, with the UIM information stored in the UIM information storage unit 103 of the UIM card 100. The determination in step S4 is hereinafter referred to as ID authentication.

If it is determined that the program data of the application corresponding to the n-th individual management information is the one downloaded using the UIM card 100 currently inserted into the connector unit 201 (step S4: YES), the access management unit 400 proceeds to a process in step S5.

On the other hand, if it is determined that the application program corresponding to the n-th individual management information is not stored in the application data storage unit 203 in step S3 (step S3: NO), and if it is determined that the program data of the application corresponding to the n-th individual management information is not the one downloaded using the UIM card 100 currently inserted into the connector unit 201 in step S4 (step S4: NO), the access management unit 400 performs a process in step S8. Specifically, if the program data of the application corresponding to the n-th individual management information does not exist in the application data storage unit 203, the access management unit 400 determines whether access restriction is required for the service data corresponding to the application corresponding to the individual management information that is stored in the SE unit 102 (it is determined whether the individual management information is Nonservice=NG).

If it is determined that access restriction is not required (step S8: NO), the access management unit 400 proceeds to a process in step S5. In step S5, if the service data that is determined not to require access restriction in step S8 is access-restricted, or if the service data corresponding to the application determined to be downloaded using the UIM card 100 currently inserted in step S4 is access-restricted, the access management unit 400 instructs the SE unit 102 to lift the access restriction. This operation is required to lift access restriction, for example, when the service data that is not access-restricted in the portable terminal 200 before transfer of the UIM card 100 is access-restricted after transfer of the UIM card 100, and the UIM card 100 is inserted again into the portable terminal 200 before transfer. After lifting the access restriction, the access management unit 400 proceeds to a process in step S6.

On the other hand, if it is determined that access restriction is required in step S8 (step S8: YES), the access management unit 400 makes settings to restrict access to the service data corresponding to the application (the first application in the claims) corresponding to the n-th individual management information stored in the SE unit 102 (step S9 (the access management step in the claims)). This is performed by using the information about access restriction for the individual management information in the information management unit 104. Accordingly, even when an access request is made by a communication service using the SE unit 102 through the antenna unit 207 of the portable terminal 200, access to the service data corresponding to the n-th individual management information stored in the SE unit 102 is restricted. This access restriction may be access restriction performed on all the information of the service data corresponding to the n-th individual management information or may be access restriction performed on partial information thereof. To perform the access restriction on partial information includes to bring about a state in which the application corresponding to the n-th individual management information can access for all the information permitted to be accessed. For example, when only access to membership number information is permitted, access is permitted only to the membership number information. After the access restriction, the access management unit 400 proceeds to a process in step S6.

In step S6, the access management unit 400 determines whether the variable n reaches the number (m) of the individual management information held by the information management unit 104. If the variable n is not equal to the number (m) of the individual management information (step S6: NO), the access management unit 400 increments the variable n by one and sets a new variable n (step S7), and returns to step S3 to perform the process as described above.

On the other hand, if the variable n is equal to the number (m) of the individual management information (step S6: YES), the application authentication (step S3) and the ID authentication (step S4) have been completed for the application programs corresponding to all the individual management information held by the information management unit 104, and the settings for access to the service data corresponding to the applications corresponding to all the individual management information held by the information management unit 104 have been completed. The process then ends.

In this manner, when the application authentication is NG (step S3: NO) or the ID authentication is NG (step S4: NO), and the application program does not exist in the portable terminal 200, access restriction can be performed for the service data that requires access restriction. On the other hand, the service data not subjected to access restriction in the SE unit 102 can be accessed from an application program stored in the application data storage unit 203 during execution of the program.

[Downloading in Case where Program Data does not Exist]

Next, a description will be given to a process of downloading program data in a case where individual management information exists in the information management unit 104 but program data of an application corresponding to the individual management information does not exist in the application data storage unit 203 of the portable terminal 200. This situation takes place, for example, when the UIM card 100 is removed from a portable terminal 200 that has used the communication service using the SE unit 102, and is then inserted into another portable terminal 200.

Figure 6:
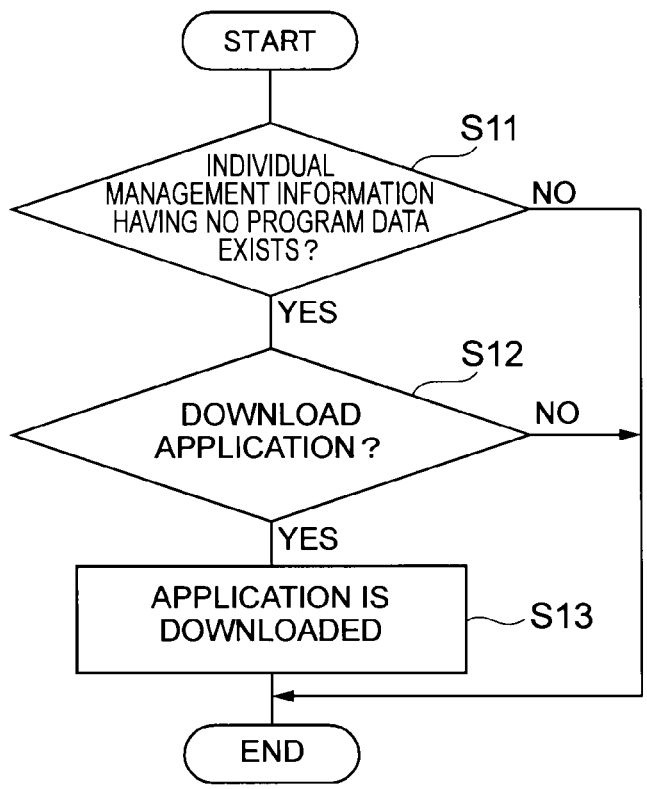
FIG. 6 is a flowchart showing a flow of a process of downloading program data of an application.

FIG. 6 is a flowchart showing a flow of a process of downloading program data of an application. First, the access management unit 400 in the SE management unit 204 determines whether there exists an application in which individual management information exists in the information management unit 104 but program data corresponding to the individual management information does not exist in the application data storage unit 203 (step S11). This determination can be made by comparing the application ID in the individual management information with the application ID in the information held by the authority information holding unit 205.

If there exists no application whose program data does not exist (step S11: NO), this process ends, assuming that program data of an application to be downloaded does not exist.

On the other hand, if there exists an application whose program data does not exist (step S11: YES), the acquisition necessity receiving unit 403 asks the user of the portable terminal 200 whether to download program data of the application (step S12). This asking is performed by displaying an inquiry screen on the output device 27 such as a display (see FIG. 2) of the portable terminal 200 and receiving select operation as to whether to download, from the user through the input device 26 such as a button operation unit.

If the user selects not to download (step S12: NO), this process ends.

On the other hand, if the user selects to download (step S12: YES), the application data acquisition unit 401 downloads the program data of the application (the second application in the claims) and stores the downloaded program data into the application data storage unit 203 (step S13). This downloading is performed through the communication module 24 based on the URL information indicating the downloading destination of the application that is included in the individual management information. After the completion of downloading, this process ends.

Accordingly, in the case where the individual management information exists in the information management unit 104 but the program data of the application corresponding to the individual management information does not exist in the application data storage unit 203, the program data of the application can be acquired.

[Downloading in Case of not Having Use Authority of UIM Card]

Next, a description will be given to a process of newly downloading program data of an application in a case where program data of the application exists in the application data storage unit 203 of the portable terminal 200 but the application does not have the use authority of the UIM card 100 currently inserted into the connector unit 201. Such a situation takes place, for example, when the UIM card 100 is removed from a portable terminal 200 that has used a communication service using the SE unit 102, and is then inserted into another portable terminal 200. Here, as a precondition of the application to be downloaded, it is assumed that more than one program data of the same application cannot be downloaded to the portable terminal 200 using the UIM card 100 having different UIM information.

Figure 7:
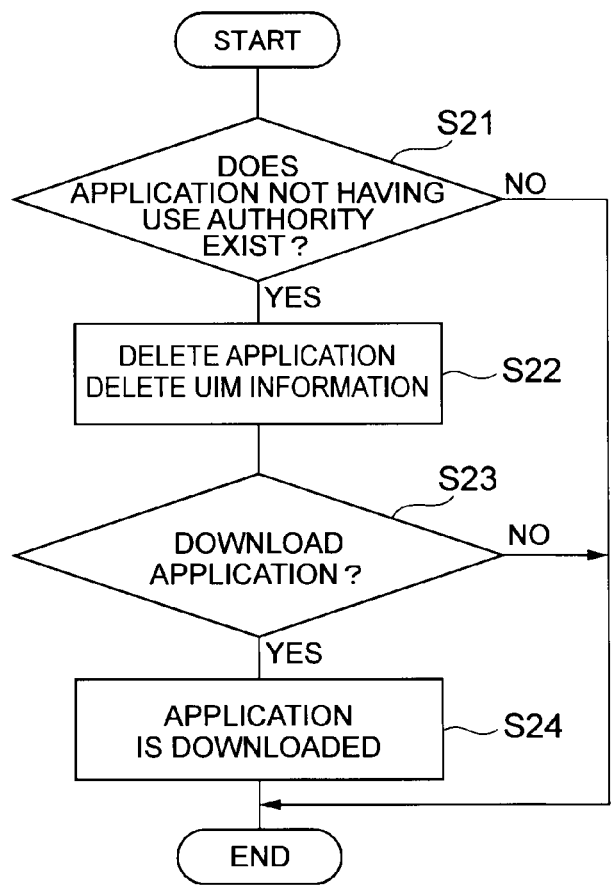
FIG. 7 is a flowchart showing a flow of a process of downloading program data of an application.

FIG. 7 is a flowchart showing a flow of a process of downloading program data of an application. First, the access management unit 400 in the SE management unit 204 determines whether program data of the application not having the use authority of the UIM card 100 currently inserted into the connector unit 201 exists in the application data storage unit 203 (step S21). This determination can be made by comparing the UIM information stored in the UIM information storage unit 103 and the application ID of the individual management information held by the information management unit 104, with the application ID and the UIM information of the application having the use authority, held by the authority information holding unit 205.

If all the applications have the use authority of the UIM card 100 (step S21: NO), this process ends, assuming that there exists no program data of an application to be downloaded.

On the other hand, if there exists an application that does not have the use authority of the UIM card 100 (step S21: YES), the application management unit 402 deletes the program data of the application not having the use authority that is stored in the application data storage unit 203 and further deletes the information (the application ID, the UIM information) about the application not having the use authority that is held by the authority information holding unit 205 (step S22). It is noted that the individual management information in the information management unit 104 is not deleted.

Next, the acquisition necessity receiving unit 403 asks the user of the portable terminal 200 whether to download the program data again for the application whose program data is deleted (step S23). This asking is performed by displaying an inquiry screen on the output device 27 such as a display (see FIG. 2) of the portable terminal 200 and receiving select operation as to whether to download, from the user through the input device 26 such as a button operation unit.

If the user selects not to download (step S23: NO), this process ends.

On the other hand, if the user selects to download (step S23: YES), the application data acquisition unit 401 downloads program data of the application (the second application in the claims) and stores the downloaded program data into the application data storage unit 203 (step S24). This downloading is performed through the communication module 24 based on the URL information indicating the downloading destination of the application that is included in the individual management information. After the completion of downloading, this process ends.

Accordingly, when the individual management information exists in the information management unit 104 but the program data of the application corresponding to the individual management information does not have the use authority of the UIM card 100 currently inserted into the connector unit 201, the program data of the application not having the use authority is deleted, and the program data of the application can be acquired again.

In the foregoing description, the program data and the UIM information of the application not having the use authority of the UIM card 100 are deleted in step S22 in FIG. 7. By contrast, in a case where more than one same application can be downloaded to portable terminal 200 using the UIM card 100 having different UIM information, as a precondition of the application to be downloaded, the process in step S22 is not performed, and a plurality of program data with different use authorities of the UIM card 100 can be stored in the application data storage unit 203. When the process of downloading program data of an application is not performed, for example, when the SE management unit 204 does not have components (the application data acquisition unit 401, the application management unit 402, the acquisition necessity receiving unit 403) other than the access management unit 400, the downloading process described using FIG. 6 and FIG. 7 can be omitted.

[Lifting Access Restriction]

Figure 8:
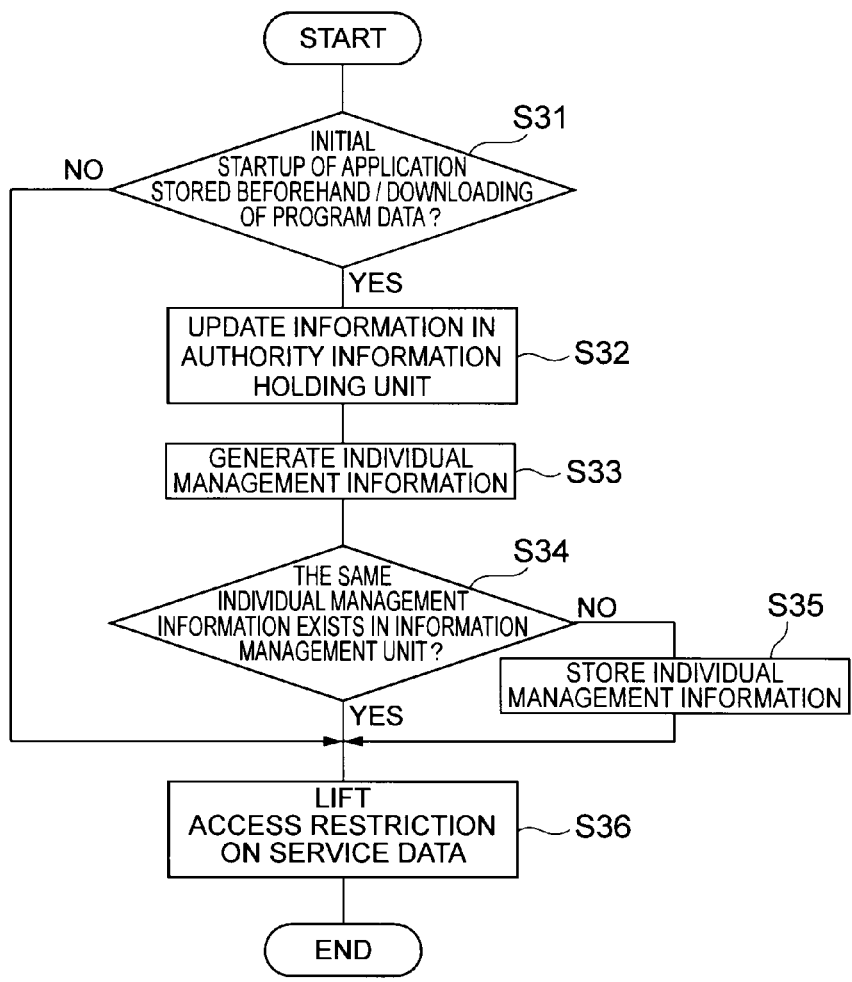
FIG. 8 is a flowchart showing a flow of a process at a time of application startup and at a time of program data acquisition.

Next, a description will be given to a process of lifting access restriction on the service data stored in the SE unit 102 in one of the cases where program data of an application (the second application in the claims) is downloaded, where program data of the upgraded application (the second application in the claims) is downloaded, and where the application (the third application in the claims) stored beforehand in the application data storage unit 203 at the time of shipment of the portable terminal 200 is started. FIG. 8 is a flowchart showing a flow of a process of lifting access restriction on service data. The flowchart shown in FIG. 8 is initiated when program data of an application is downloaded, when program data of the upgraded application is downloaded, or when the application stored beforehand in the application data storage unit 203 at the time of shipment of the portable terminal 200 is started.

First, the access management unit 400 determines whether it is the initial startup of the application stored beforehand and whether it is the downloading of program data (including new downloading and downloading due to upgrade) (step S31).

If it is not the initial start up/downloading of program data (step S31: NO), the SE management unit 204 proceeds to step S36.

On the other hand, if it is the initial startup/downloading of program data (step S31: YES), the access management unit 400 updates the information held by the authority information holding unit 205 (step S32). Here, the information is updated such that the started or downloaded application has the use authority of the UIM card 100 currently inserted into the connector unit 201. This update includes, for example, that default data (null) preset in a prescribed region of the authority information holding unit 205 is overwritten with information that the started or downloaded application has the use authority of the UIM card 100 currently inserted into the connector unit 201.

Next, the access management unit 400 generates individual management information corresponding to the started or downloaded application (step S33).

Next, the access management unit 400 determines whether the same individual management information as the individual management information generated in step S33 exists in the information management unit 104 (step S34). If the same individual management information exists (step S34: YES), the SE management unit 204 proceeds to a process in step S36.

On the other hand, if the same individual management information does not exist (step S34: NO), the individual management information generated in step S33 is stored in the information management unit 104 (step S35). This storage includes, for example, that default data (null) preset in a prescribed region in the information management unit 104 is overwritten with the generated individual management information. After storing the individual management information, the SE management unit 204 proceeds to a process in step S36.

In step S36, the access management unit 400 lifts the access restriction to bring about the accessible state for the service data in the SE unit 102 corresponding to the application stored beforehand or the application whose program data is downloaded.

Accordingly, at the time of initial startup of the application stored beforehand and at the time of downloading of program data, individual management information can be newly created and stored. In addition, the access restriction on the corresponding service data in the SE unit 102 is lifted, so that the application stored beforehand and the application whose program data is downloaded can use the service data in the SE unit 102. When the program data is upgraded, the access restriction lifting process explained using FIG. 8 may be omitted.

[Operation and Effects]

Next, the operation and effects of the access management system 10 in the first embodiment will be described.

According to the first embodiment, the SE unit 102 holding service data used by the application executed using the UIM card 100 and the information management unit 104 are provided in the UIM card 100. Therefore, when the UIM card 100 is transferred between the portable terminals 200, the service data and the individual management information can be moved to another portable terminal 200 together with the UIM card 100. Accordingly, there is no need for separately performing a process of moving service data and individual management information to another portable terminal 200, in addition to the operation of transferring the UIM card 100, thereby improving the convenience.

According to the first embodiment, the access management unit 400 of the portable terminal 200 determines whether the UIM information stored in the UIM information storage unit 103 agrees with the UIM information of a prescribed application having the use authority that is held by the authority information holding unit 205. If they do not agree, access to the service data corresponding to a prescribed application held by the SE unit 102 is partially enabled or the access is disabled. Accordingly, such inconvenience as unintentional access to service data held by the SE unit 102 can be prevented.

According to the first embodiment, the access management unit 400 of the portable terminal 200 determines whether the application ID of the individual management information held by the information management unit 104 agrees with the application ID of the information held by the authority information holding unit 205. If they do not agree, access to the service data corresponding to the application having the mismatched name that is held by the SE unit 102 is partially enabled or the access is disabled. In other words, when the service data corresponding to a prescribed application is stored in the SE unit 102 but the prescribed application does not exist in the application data storage unit 203 of the portable terminal 200, access to the service data corresponding to the prescribed application stored in the SE unit 102 can be restricted. Therefore, such inconvenience as unintentional access to service data held by the SE unit 102 can be prevented.

According to the first embodiment, even when the information management unit 104 has the individual management information of an application but the program data of the application does not exist in the application data storage unit 203 of the portable terminal 200, access to the service data held by the SE unit 102 of the UIM card 100 is partially enabled, thereby improving convenience.

According to the first embodiment, when the information management unit 104 of the UIM card 100 has the individual management information of an application but the program data of the application does not exist in the application data storage unit 203 of the portable terminal 200, the application data acquisition unit 401 can acquire the program data of the application.

According to the first embodiment, when the program data of an application exists in the application data storage unit 203 of the portable terminal 200 but the program data of the application does not have the use authority of the UIM card 100, the application data acquisition unit 401 can newly acquire the program data of the application.

According to the first embodiment, the application management unit 402 deletes the program data of an application stored by the application data storage unit 203 and the UIM information held by the authority information holding unit 205. Accordingly, accumulation of unnecessary information in the application data storage unit 203 and the authority information holding unit 205 can be prevented, so that the application data storage unit 203 and the authority information holding unit 205 can be used efficiently.

According to the first embodiment, when the program data of an application is acquired, the acquisition necessity receiving unit 403 asks a user whether acquisition is necessary. Accordingly, acquisition of program data not intended by the user can be prevented, thereby improving the user's convenience.

According to the first embodiment, the application data acquisition unit 401 acquires the program data of an application through wireless communication based on the URL information. Accordingly, the convenience of program data acquisition can be improved.

According to the first embodiment, at a time of downloading of an application program, the UIM information and the individual management information can be rewritten.

According to the first embodiment, at a time of initial startup of an application program, the UIM information and the individual management information can be rewritten.

Second Embodiment

Next, a second embodiment of the present invention will be described. It is noted that a description of a part overlapping with the foregoing first embodiment will be omitted, and a difference from the first embodiment will be mainly described.

Figure 9:
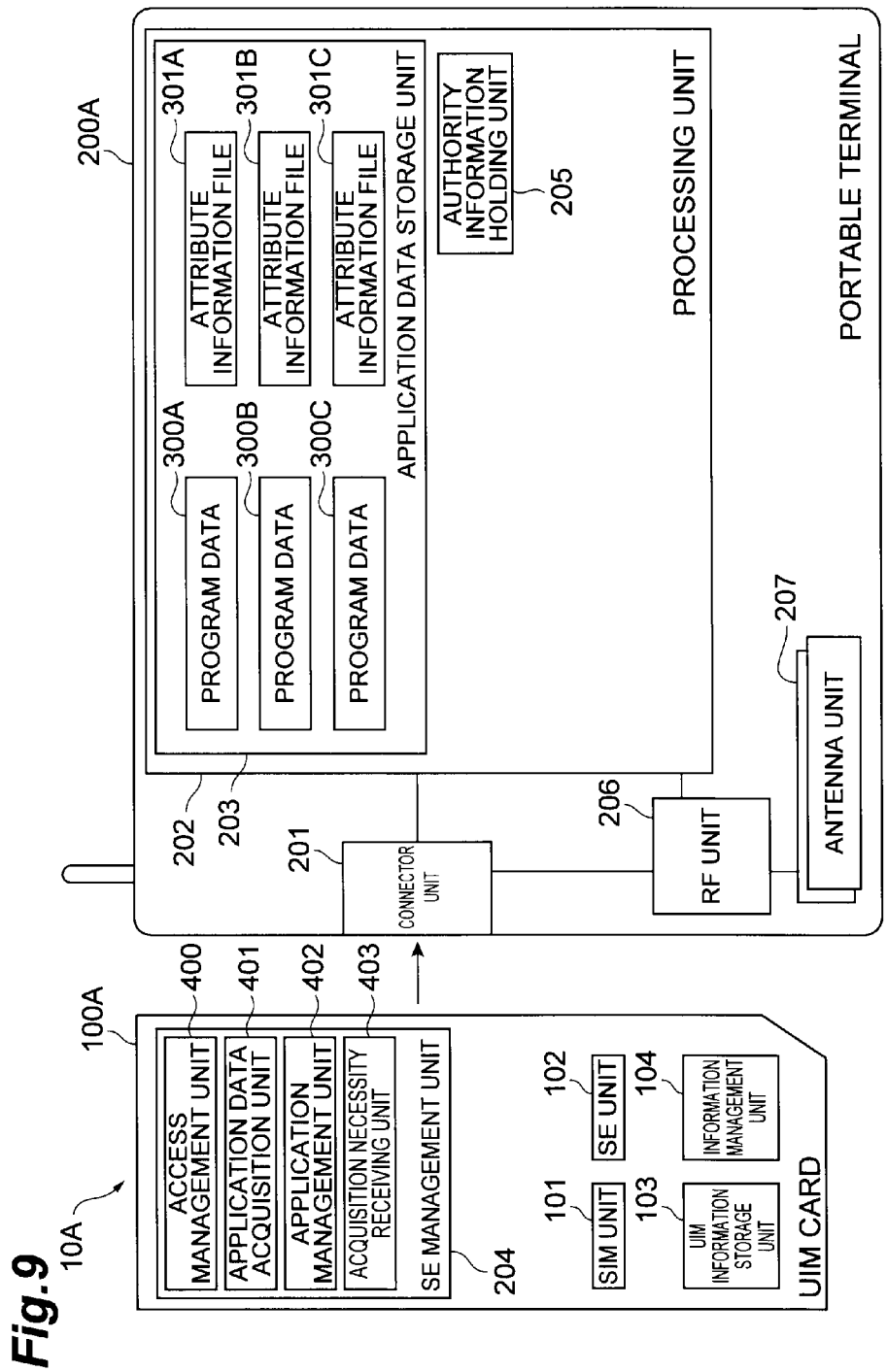
FIG. 9 is a diagram showing an overall configuration of an access management system in a second embodiment.
Figure 10:
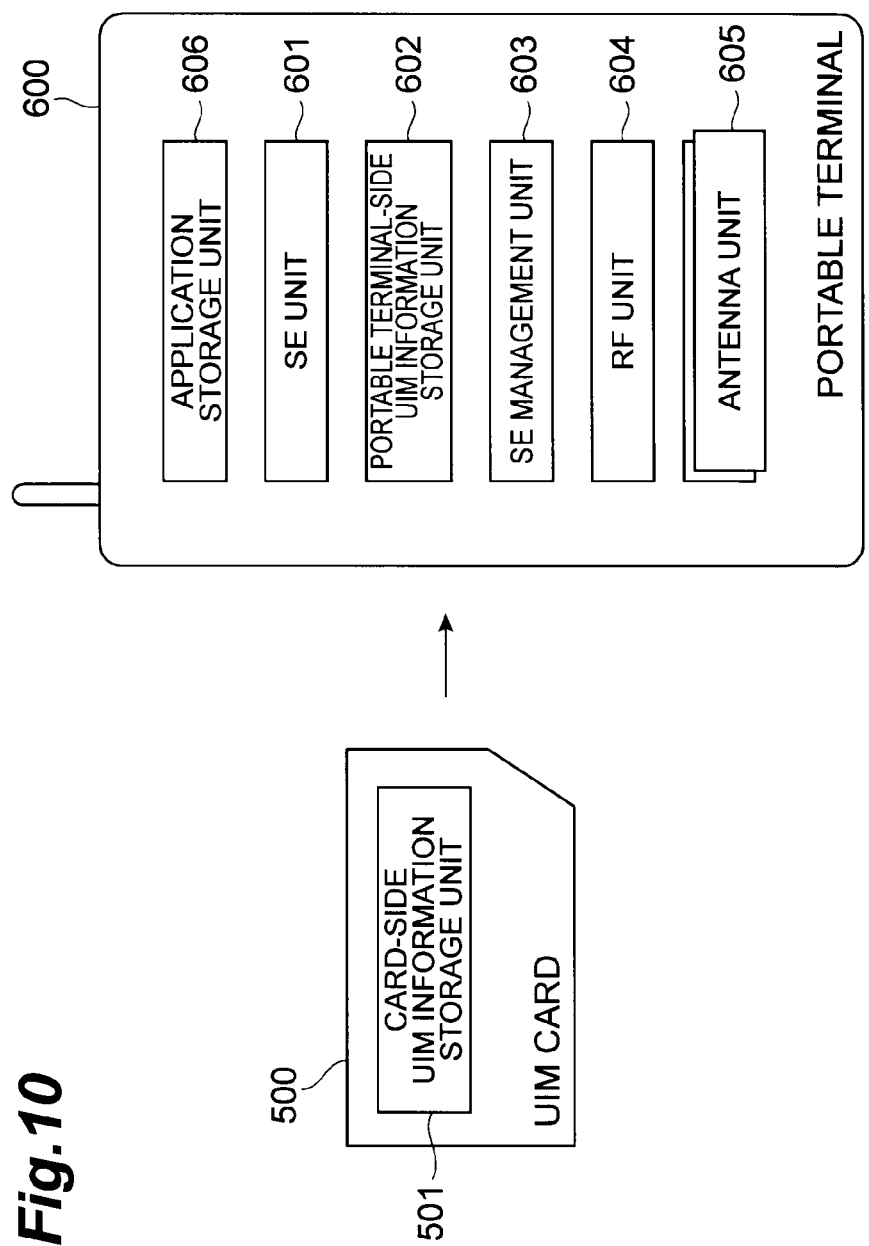
FIG. 10 is a diagram showing an overall configuration of conventional UM card and portable terminal.

FIG. 9 is a configuration overview of an access management system 10A according to the second embodiment of the present invention. As shown in FIG. 9, the access management system 10A includes a UIM card 100A (the smart card in the claims) and a portable terminal 200A (the terminal in the claims). When compared with the first embodiment, the SE management unit 204 is arranged in the UIM card 100A.

The SE management unit 204 in the second embodiment performs the same processing as the SE management unit 204 in the first embodiment. The SE management unit 204 can restrict access to service data held by the SE unit 102 (the service data holding means in the claims), download an application program, delete program data and UIM information, and rewrite UIM information and individual management information, in a similar manner as in the first embodiment.

[Operation and Effects]

Next, the operation and effects of the access management system 10A in the second embodiment will be described.

According to the second embodiment, the SE unit 102 holding service data used by an application executed using the UIM card 100A for data processing and the information management unit 104 are provided in the UIM card 100A. Therefore, when the UIM card 100A is transferred between the portable terminals 200A, service data and individual management information can be moved to another portable terminal 200A together with the UIM card 100A. Accordingly, there is no need for separately performing a process of moving service data and individual management information to another portable terminal 200A, in addition to the operation of transferring the UIM card 100A, thereby improving the convenience.

According to the second embodiment, the access management unit 400 in the UIM card 100A determines whether the UIM information stored in the UIM information storage unit 103 agrees with the UIM information of a prescribed application having the use authority that is held by the authority information holding unit 205. If they do not agree, access to the service data corresponding to a prescribed application that is held by the SE unit 102 is only partially enabled or the access is disabled. Accordingly, such inconvenience as unintentional access to the service data held by the SE unit 102 can be prevented.

According to the second embodiment, the access management unit 400 in the UIM card 100A determines whether the application ID of the individual management information held by the information management unit 104 agrees with the application ID of the information held by the authority information holding unit 205. If they do not agree, access to the service data corresponding to the application having the mismatched name that is held by the SE unit 102 is only partially enabled or the access is disabled. In other words, when service data corresponding to a prescribed application is stored in the SE unit 102 but the prescribed application does not exist in the application data storage unit 203 in the portable terminal 200A, access to the service data corresponding to the prescribed application that is stored in the SE unit 102 can be restricted. Therefore, such inconvenience as unintentional access to service data held by the SE unit 102 can be prevented.

It is noted that the present invention is not limited to the foregoing embodiments.

For example, an application ID of individual management information is used when application authentication is performed. However, any other information may be used. Furthermore, although the FeliCa function is shown as the short-range wireless communication by way of example, any other short-range wireless communication may be used. Instead of the short-range wireless communication, wired communication may be performed.

In the second embodiment, all the functional units in the SE management unit 204 (the access management unit 400, the application data acquisition unit 401, the application management unit 402, the acquisition necessity receiving unit 403) are arranged in the UIM card 100A. In this respect, only a prescribed functional unit in the SE management unit 204 can be arranged in the UIM card 100A. For example, only the access management unit 400 may be arranged in the UIM card 100A and the remaining application data acquisition unit 401, application management unit 402, and acquisition necessity receiving unit 403 may be arranged in the portable terminal 200A.

REFERENCE SIGNS LIST 10, 10A . . . access management system, 100, 100A . . . UIM card, 102 . . . SE unit, 103 . . . UIM information storage unit, 104 . . . information management unit, 200, 200A . . . portable terminal, 204 . . . SE management unit, 205 . . . authority information holding unit, 400 . . . access management unit, 401 . . . application data acquisition unit, 402 . . . application management unit, 403 . . . acquisition necessity receiving unit.

The invention claimed is:

1. An access management system comprising:
a smart card; and
a terminal reading the smart card to perform processing,
the smart card including:
identification information storing means for storing smart card identification information capable of identifying the smart card, service data holding means for holding and processing service data that is access data for performing near-field communication with a counter-part device, and information management means for holding access control information for controlling access to the service data, and the terminal including:

application data storing means for storing program data of an application that uses the service data, authority information holding means for holding the smart card identification information of the smart card that is authorized to be used by the program data of the application stored in the application data storing means, and access management means for, if the smart card identification information stored in the identification information storing means agrees with the smart card identification information held by the authority information holding means, enabling access to the service data holding means of the smart card and enabling performance of the near-field communication, and if not agree, disabling access to the service data holding means of the smart card and disabling performance of the near-field communication.

2. The access management system according to claim 1, wherein the terminal further includes an application data acquisition unit for, if program data of a second application is stored in the application data storing unit and if the access management unit determines that the smart card identification information, held by the authority information holding unit, of the smart card that is authorized to be used by the program data of the second application does not agree with the smart card identification information stored in the identification information storing unit, acquiring new program data of the second application and storing the program data into the application data storing unit.

3. The access management system according to claim 1, wherein when a third application is initially started or when the service data used by the third application that is held in the service data holding unit is accessed, at least one of followings is performed:

the information management unit rewrites at least one of the access control information and the application authentication information in the third application; and the authority information holding unit rewrites the smart card identification information of the smart card that is authorized to be used by program data of the third application.

4. The access management system according to claim 2, wherein the terminal further includes an application management unit for, if the access management unit determines that the smart card identification information, held by the authority information holding unit, of the smart card that is authorized to be used by the program data of the second application does not agree with the smart card identification information stored in the identification information storing unit, deleting the program data of the second application determined such that the smart card identification information does not agree, from the application data storing unit, and deleting the smart card identification information of the smart card that is authorized to be used by the program data of the second application determined such that the smart card identification information does not agree, from the authority information holding unit.

5. An access management system comprising:
a smart card; and
a terminal reading the smart card to perform processing, the smart card including:

a service data holding unit for holding and processing service data that is access data for performing near-field communication with a counter-part device, and an information management unit for holding access control information for controlling access to the service data and application authentication information for authenticating the application that uses the service data; and the terminal including:

an application data storing unit for storing program data of the application, an authority information holding unit for holding application authentication information for authenticating the application executed by the program data stored in the application data storing unit, and an access management unit for, if the application authentication information held by the information management unit agrees with the application authentication information held by the authority information holding unit, enabling access to the service data holding unit of the smart card and enabling performance of the near-field communication, and if not agree, disabling access to the service data holding unit of the smart card and disabling performance of the near-field communication.

6. The access management system according to claim 5, wherein when the information management unit has application authentication information for authenticating a first application and program data of the first application is not stored in the application data storing unit, the access management unit only partially enables access to the service data used by the first application that is held by the service data holding unit.

7. The access management system according to claim 5, wherein the terminal further includes an application data acquisition unit for, if the information management unit holds application authentication information for authenticating a second application and if the authority information holding unit does not hold application authentication information for authenticating the second application, acquiring program data of the second application through communication unit and storing the program data into the application data storing unit.

8. The access management system according to claim 7, wherein
the terminal further includes an acquisition necessity receiving unit for presenting to a user of the terminal whether acquisition of the program data of the second application is necessary when the application data acquisition unit acquires the program data of the second application, and receiving input operation by the user of the terminal as to whether acquisition is necessary, and the application data acquisition unit acquires the program data of the second application according to a result of receiving in the acquisition necessity receiving unit.

9. The access management system according to claim 7, wherein
the information management unit further holds URL information for downloading the second application as the access control information in the second application, the communication unit is capable of acquiring the program data of the second application through wireless communication, and the application data acquisition unit acquires the program data of the second application through wireless communication by the communication unit based on the URL information for downloading the second application that is held by the information management unit.

10. The access management system according to claim 7, wherein when the application data acquisition unit acquires the program data of the second application, at least one of followings is performed: the information management unit rewrites at least one of the access control information and the application authentication information in the second application; the authority information holding unit rewrites the smart card identification information of the smart card that is authorized to be used by the program data of the second application; and the authority information holding unit rewrites the application authentication information in the second application.

11. An access management system comprising:
a smart card; and
a terminal reading the smart card to perform processing,
the smart card including:
an identification information storing unit for storing smart card identification information capable of identifying the smart card,
a service data holding unit for holding and processing service data that is access data for performing near-field communication with a counter-part device, and
an information management unit for holding access control information for controlling access to the service data and application authentication information for authenticating the application that uses the service data; and
the terminal including:
an application data storing unit for storing program data of the application,
an authority information holding unit for holding application authentication information for authenticating the application executed by the program data stored in the application data storing unit and the smart card identification information of the smart card that is authorized to be used by the program data of the application, and
an access management unit for enabling access to the service data holding unit of the smart card and enabling performance of the near-field communication if the smart card identification information stored in the identification information storing unit agrees with the smart card identification information held by the authority information holding unit and if the application authentication information held by the information management unit agrees with the application authentication information held by the authority information holding unit, and disabling access to the service data holding unit of the smart card and disabling performance of the near-field communication in at least one of cases where the smart card identification information stored in the identification information storing unit does not agree with the smart card identification information held by the authority information holding unit and where the application authentication information held by the information management unit does not agree with the application authentication information held by the authority information holding unit.

12. An access management system comprising:
a smart card; and
a terminal reading the smart card to perform processing,
the terminal including:
an application data storing unit for storing program data of an application that uses service data held by the smart card, and
an authority information holding unit for holding a smart card identification information of the smart card that is authorized to be used by the program data of the application stored in the application data storing unit; and
the smart card including:
an identification information storing unit for storing the smart card identification information of the smart card,
a service data holding unit for holding and processing the service data that is access data for performing near-field communication with a counter-part device,
an information management unit for holding access control information for accessing the service data, and
an access management unit for, if the smart card identification information stored in the identification information storing unit agrees with the smart card identification information held by the authority information holding unit, enabling access to the service data holding unit of the smart card and enabling performance of the near-field communication, and if not agree, disabling access to the service data holding unit of the smart card and disabling performance of the near-field communication.

13. An access management system comprising:
a smart card; and
a terminal reading the smart card to perform processing,
the terminal including:
an application data storing unit for storing program data of an application that uses service data held by the smart card, and
an authority information holding unit for holding application authentication information for authenticating the application executed by the program data stored in the application data storing unit; and
the smart card including:
a service data holding unit for holding and processing the service data that is access data for performing near-field communication with a counter-part device,
an information management unit for holding access control information for controlling access to the service data and application authentication information for authenticating the application that uses the service data, and
an access management unit for, if the application authentication information held by the information management unit agrees with the application authentication information held by the authority information holding unit, enabling access to the service data holding unit of the smart card and enabling performance of the near-field communication, and if not agree, disabling access to the service data holding unit of the smart card and disabling performance of the near-field communication.

14. An access management system comprising:
a smart card; and
a terminal reading the smart card to perform processing,
the terminal including:
an application data storing unit for storing program data of an application that uses service data held by the smart card, and
an authority information holding unit for holding application authentication information for authenticating the application executed by the program data stored in the application data storing unit and the smart card identification information of the smart card that is authorized to be used by the program data of the application; and the smart card including:
an identification information storing unit for storing the smart card identification information of the smart card,
a service data holding unit for holding and processing the service data that is access data for performing near-field communication with a counter-part device,
an information management unit for holding access control information for controlling access to the service data and application authentication information for authenticating the application that uses the service data, and
an access management unit for enabling access to the service data holding unit of the smart card and enabling performance of the near-field communication if the smart card identification information stored in the identification information storing unit agrees with the smart card identification information held by the authority information holding unit and if the application authentication information held by the information management unit agrees with the application authentication information held by the authority information holding unit, and disabling access to the service data holding unit of the smart card and disabling performance of the near-field communication in at least one of cases where the smart card identification information stored in the identification information storing unit does not agree with the smart card identification information held by the authority information holding unit and where the application authentication information held by the information management unit does not agree with the application authentication information held by the authority information holding unit.

15. An access management method executed in an access management system that comprises a smart card and a terminal reading the smart card to perform processing, the smart card including: an identification information storing unit for storing smart card identification information capable of identifying the smart card, a service data holding unit for holding and processing service data that is access data for performing near-field communication with a counter-part device, and an information management unit for holding access control information for controlling access to the service data and application authentication information for authenticating the application that uses the service data, and the terminal including: an application data storing unit for storing program data of the application, and an authority information holding unit for holding application authentication information for authenticating the application executed by the program data stored in the application data storing unit and the smart card identification information of the smart card that is authorized to be used by the program data of the application, the access management method comprising:

determining, in the terminal, whether the smart card identification information stored in the identification information storing unit agrees with the smart card identification information held by the authority information holding unit and whether the application authentication information held by the information management unit agrees with the application authentication information held by the authority information holding unit; and enabling, in the terminal, access to the service data holding unit of the smart card and enabling performance of the near-field communication if it is determined by the determining that the smart card identification information stored in the identification information storing unit agrees with the smart card identification information held by the authority information holding unit and that the application authentication information held by the information management unit agrees with the application authentication information held by the authority information holding unit, and disabling access to the service data holding unit of the smart card and disabling performance of the near-field communication in at least one of cases where it is determined that the smart card identification information stored in the identification information storing unit does not agree with the smart card identification information held by the authority information holding unit and where it is determined that the application authentication information held by the information management unit does not agree with the application authentication information held by the authority information holding unit.

16. An access management method executed in an access management system that comprises a smart card and a terminal reading the smart card to perform processing, the terminal including: an application data storing unit for storing program data of an application that uses service data held by the smart card, and an authority information holding unit for holding application authentication information for authenticating the application executed by the program data stored in the application data storing unit and a smart card identification information of the smart card that is authorized to be used by the program data of the application, and the smart card including: an identification information storing unit for storing the smart card identification information of the smart card, a service data holding unit for holding and processing the service data that is access data for performing near-field communication with a counter-part device, and an information management unit for holding access control information for controlling access to the service data and application authentication information for authenticating the application that uses the service data, the access management method comprising:

determining, in the smart card, whether the smart card identification information stored in the identification information storing unit agrees with the smart card identification information held by the authority information holding unit and whether the application authentication information held by the information management unit agrees with the application authentication information held by the authority information holding unit; and enabling, in the smart card, access to the service data holding unit of the smart card and enabling performance of the near-field communication if it is determined by the determining that the smart card identification information stored in the identification information storing unit agrees with the smart card identification information held by the authority information holding unit and that the application authentication information held by the information management unit agrees with the application authentication information held by the authority information holding unit, and disabling access to the service data holding unit of the smart card and disabling performance of the near-field communication in at least one of cases where it is determined that the smart card identification information stored in the identification information storing unit does not agree with the smart card identification information held by the authority information holding unit and where it is determined that the application authentication information held by the information management unit does not agree with the application authentication information held by the authority information holding unit.

* * * * *